United States Patent

Gonas

[11] Patent Number: 5,806,924
[45] Date of Patent: Sep. 15, 1998

[54] BABY SEAT

[75] Inventor: Albert J. Gonas, Grosse Pointe Shores, Mich.

[73] Assignee: Cambridge Industries, Inc., Madison Heights, Mich.

[21] Appl. No.: 767,822

[22] Filed: Dec. 17, 1996

[51] Int. Cl.$^6$ ...................................................... B60N 2/28
[52] U.S. Cl. ................ 297/216.11; 297/464; 297/250.1; 297/183.6; 297/184.11; 297/184.13; 160/37
[58] Field of Search ............................. 297/183.2, 183.4, 297/183.6, 184.11, 184.13, 184.14, 184.15, 452.65, 452.22, 216.11, 464, 250.1; 160/37

[56] References Cited

U.S. PATENT DOCUMENTS

| | | | |
|---|---|---|---|
| 826,332 | 7/1906 | Hayden | 297/464 X |
| 1,782,110 | 11/1930 | Wetzler | 160/37 X |
| 2,606,601 | 8/1952 | Saarinen | 297/DIG. 2 X |
| 3,218,103 | 11/1965 | Boyce | 297/464 X |
| 3,713,695 | 1/1973 | Von Wimmersperg . | |
| 3,865,429 | 2/1975 | Barker | 297/184.14 |
| 4,081,156 | 3/1978 | Ideskar | 297/466 X |
| 4,311,339 | 1/1982 | Heath . | |
| 4,366,587 | 1/1983 | Takada | 297/216.11 X |
| 4,500,135 | 2/1985 | Kincheloe | 297/216.11 |
| 4,509,097 | 4/1985 | Robinson | 297/217.3 X |
| 4,579,385 | 4/1986 | Koenig . | |
| 4,790,592 | 12/1988 | Busso et al. | 297/184.11 |
| 4,955,636 | 9/1990 | Sundberg et al. . | |
| 5,007,674 | 4/1991 | Franc . | |
| 5,074,616 | 12/1991 | Smith . | |
| 5,098,161 | 3/1992 | Minami et al. | 297/464 |
| 5,232,263 | 8/1993 | D'Ull et al. . | |
| 5,478,135 | 12/1995 | Kain | 297/256.16 |
| 5,522,639 | 6/1996 | Jaime | 297/184.11 X |
| 5,662,379 | 9/1997 | Zimelman | 297/216.11 X |

FOREIGN PATENT DOCUMENTS

| | | | |
|---|---|---|---|
| 1007668 | 2/1952 | France | 160/37 |
| 1537611 | 7/1968 | France | 297/464 |
| 1087146 | 8/1960 | Germany | 160/37 |
| 4137596 | 5/1993 | Germany | 297/250.1 |
| 406219195 | 8/1994 | Japan | 297/250.1 |
| 439329 | 12/1935 | United Kingdom | 312/213 |

*Primary Examiner*—Peter R. Brown
*Assistant Examiner*—David E. Allred
*Attorney, Agent, or Firm*—Reising, Ethington, Learman & McCulloch

[57] ABSTRACT

An infant carrier (10) has an upper opening (32) that has a track (42) at each edge. A sliding door (40) is mounted in the track (42) for movement between an open and closed position. The door has mesh covered windows (43) that provide visibility to the infant and vision for the infant. The door is flexible in the longitudinal direction to expeditiously slide in the track which is contoured about the housing.

19 Claims, 3 Drawing Sheets

BABY SEAT

TECHNICAL FIELD

The field of this invention relates to an multipurpose infant carrier that provides protection for an infant particularly when the infant is in transit in an air-bag equipped motor vehicle or other moving carriage or cart.

BACKGROUND OF THE DISCLOSURE

It is well known that infants should be harnessed in an infant seat or carrier when travelling in a motor vehicle to provide a degree of protection during an emergency stop or an accident. In fact, many legal jurisdictions now legally require that the infant be harnessed in an appropriate carrier when in a motor vehicle.

It is now common that front passenger seats are equipped with air bag protection. These air bags are also available in mini-vans as well as automobiles. Some makes of vehicles offer air bag equipment for the rear seats as well. The passenger air bags are designed as a supplemental inflatable restraint commonly referred to as an S.I.R. to be used in conjunction with a seat and lap belt assembly to stop the forward momentum of an adult i.e. a body mass that commonly exceeds two-hundred pounds. New born infants often weigh less than ten pounds and consequently, they are placed in a carrier with a differently constructed harness connection. In turn, the carrier is anchored by the adult seat belt. However, no designs have been commercially available to vary the air bag impact of an actuated air bag for an infant. When force from an air bag that is designed to stop an adult is used against a much lighter infant, the resulting force may be well in excess of what is needed and undesirable complications may be produced. No commercially available seat baby carriers have directed its construction to obviate or prevent excessive impact of the air bag actuation on the infant.

Furthermore, while infant seats are required in many jurisdictions for transporting an infant in a motor vehicle, many parents who have new born infants are financially strained and can ill afford a first infant carrier for a motor vehicle, a second infant carrier for pedestrian mobility, a third infant carrier as a rocker, or a fourth infant carrier for use with a stroller or for use with a grocery cart. Parents of an infant need an infant carrier that can function for multiple purposes to reduce their financial strain.

It is thus desirable to produce an infant carrier that provides protection to the infant against direct impact of an actuated air bag while also being portable and functional as an independent carrier and rocker. What is further needed is an infant carrier that can shield an infant from outside objects while providing for comfort for the infant, good visibility of the infant, and easy accessibility and maneuverability.

SUMMARY OF THE DISCLOSURE

In accordance with one aspect of the invention, an infant carrier includes a housing having two opposing side walls, a bottom panel for seating cushioned bedding material, a foot section, and a head section to define an infant receiving interior and an opening to the interior. Preferably, a restraining harness mechanism is connected to the housing for restraining an infant within the interior section of the housing. A sliding door is mounted for movement in the opening to the interior between an open position and a closed position. The sliding door has a frame at its outer periphery that slides in a top edge portion of the side wall that is positioned above and spaced from any infant placed in the carrier. The sliding door has a flexible cover sheet of mesh material connected to the frame such that when the door is in the closed position, the mesh is positioned to restrain displacement of an infant's head from out of said carrier seat through said opening and preventing extraneous objects from intruding into the interior and contacting the infant.

Preferably, the housing is comprised of two opposing halves affixed together along a longitudinal axis of the carrier. In one embodiment, the side walls each have a seat belt receiving aperture located below the bottom panel. Furthermore, it is desirable that at least one of the side walls has a window opening therethrough. Preferably, a see-through mesh material covers the window and has an outer peripheral section embedded into the structural material of the side walls. It is desirable that a light is mounted on the housing for illuminating the interior of the carrier.

In one embodiment, the infant carrier has each of its side walls constructed with a bottom edge to function as a rocker by having an arc from the head section to the foot section. The two bottom edges are parallel to each other to provide rocking motion of the carrier when positioned on a flat floor surface.

In one embodiment, the sliding door slides within a track section formed in each side wall. The track curves from the top edge around a foot section of the carrier and to a bottom portion below the bottom platform of the carrier. A portion of the track passes below the seat belt receiving aperture and is substantially parallel to the contour of arced bottom edge.

It is preferable that the infant carrier has a respective fixed handle located at the respective foot and head sections of the housing to receive a rocking force for manual rocking of the infant carrier when on a flat base surface and to provide for manual lifting of said carrier by two hands.

The infant carrier preferably has a central carrying handle spanning transversely across the top of the carrier and having end sections pivotably to the housing for movement between an operable position and a stored position. The carrying handle has a top span section extending across and above the opening when the handle is in an operable position and being in proximity to the head of the opening when in the stored position. Preferably, the carrying handle has a grasping section that is longitudinal with the major axis of the carrier such that the carrier can be carried with the major axis aligned with the direction of travel at the side of the person carrying the carrier.

In one embodiment, the carrying handle incorporates a lock mechanism to selectively lock the handle in place and prevent pivoting of the handle with respect to the carrier when in the operable position. The top edge of the side wall may have recesses for receiving the central handle when in the stored position.

In accordance with another aspect of the invention, the infant carrier has a restraining harness mechanism conventionally connected to the housing for restraining an infant within the interior section of the housing and a roll door mechanism mounted for movement in the opening to the interior between an open position and a closed position. The opening is substantially upwardly facing through a top section of the carrier and has a curved track device at each lateral side thereof which curves around the foot section to a position below the bottom panel. The roll door is flexible along its longitudinal length to follow the contour of the track device to move from the bottom section of the carrier, through the foot section and to the top section of the carrier.

The roll door when in the closed position is positioned to restrain displacement of an infant's head from out of said carrier seat through the opening and preventing extraneous objects from intruding into the interior and contacting the infant.

In this fashion, an infant carrier provides protection to the infant against direct impact of an actuated air bag while also being portable and function as an independent carrier and rocker. The infant carrier also shields an infant from outside objects such as falling objects from high shelves within supermarkets or from snooping pets and other animals while providing for good visibility of the infant, good field of vision for the infant and easy accessibility and maneuverability.

BRIEF DESCRIPTION OF THE DRAWINGS

Reference now is made to the accompanying drawings in which.

DETAILED DESCRIPTION OF THE PREFERRED EMBODIMENT

Figure 1:
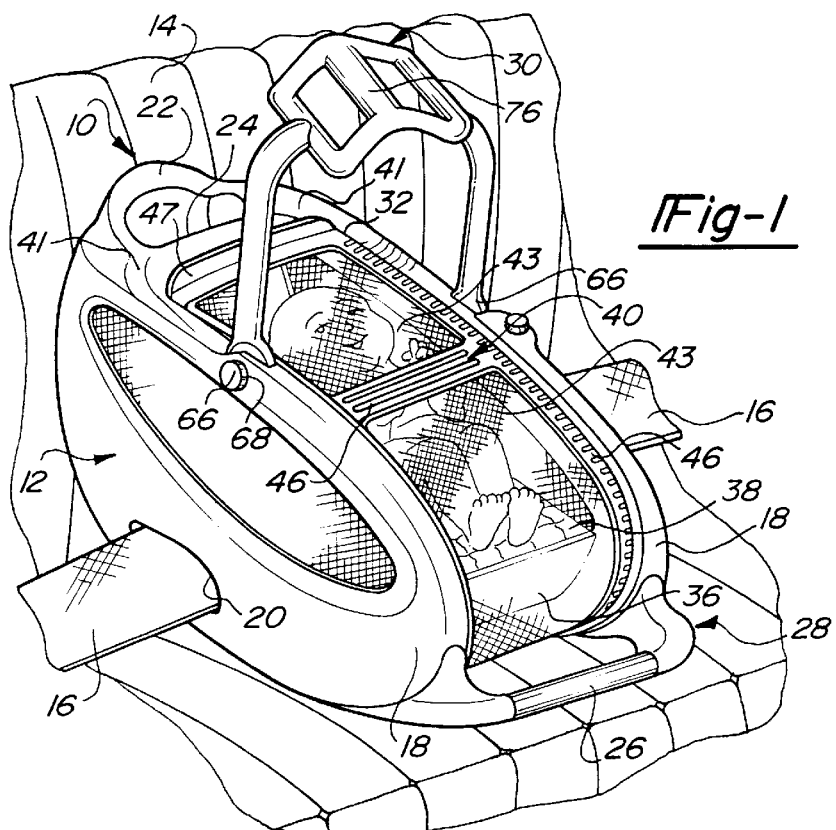
FIG. 1 is a top perspective view of an infant carrier shown strapped into a motor vehicle in accordance with one aspect of the invention and the carrying handle in the up and operable position.

Referring now to FIG. 1, an infant carrier 10 has a housing 12 that can be secured in a motor vehicle seat 14 via the seat belt mechanism 16 of the motor vehicle. The housing 12 has side sections 18 each with a seat belt receiving aperture 20. The housing has a handle 22 at the head section 24, another handle 26 at the foot section 28 and a third pivotable central carrying handle 30.

The housing forms a longitudinal upper opening 32 to allow access to the interior 34 of the housing 12. The interior has a bottom panel 36 that may seat an appropriate cushion 38. The cushion may have a thermostatically controlled electric heater device to warm the cushion. The device may be battery powered or have a cord that plugs into a motor vehicle power socket.

A sliding door 40 is mounted to open and close the opening 32. The door is mounted in a track 42 that is at opposite side top edges 44 of the opening 32 that are above and spaced from any infant positioned in the interior 34. The top edge may be provided with a recessed groove 41 to provide storage of handle 30. The track 42 extends to and wraps around the foot section 28 of the housing and back under the bottom support panel 36.

The door 40 has plastic coated ribbed supports 46 that extend from side to side of the door. The door is flexible in the longitudinal direction to provide that the door flexes as its moves through the contoured track 42. The door may have a plurality of mesh windows 43 with the mesh molded directly into the plastic material of the ribbed supports. The mesh may be made from nylon or other threaded material to allow the infant to be viewed and provide for adequate vision of the infant. The head end of the door may be provided with an operating flange or handle 47 to expedite movement of the door along track 42 between the closed and open positions.

Each side section 18 has a lower edge 48 that is arcuate in shape to define a rocker. A clearly shown in FIG. 4, the track 42 has a lower section 50 that is interposed between the aperture 20 and the rocker edge 48. The door can slide in the upper part of track 42 or when in the open position slides in the lower section of track 42. Both positions of the door are simultaneously shown in FIG. 4.

Each side section 18 has a side window 52 that is covered with mesh material 54. The mesh 54 has its periphery 55 directly molded into the side section 18 of the housing.

Figure 3:
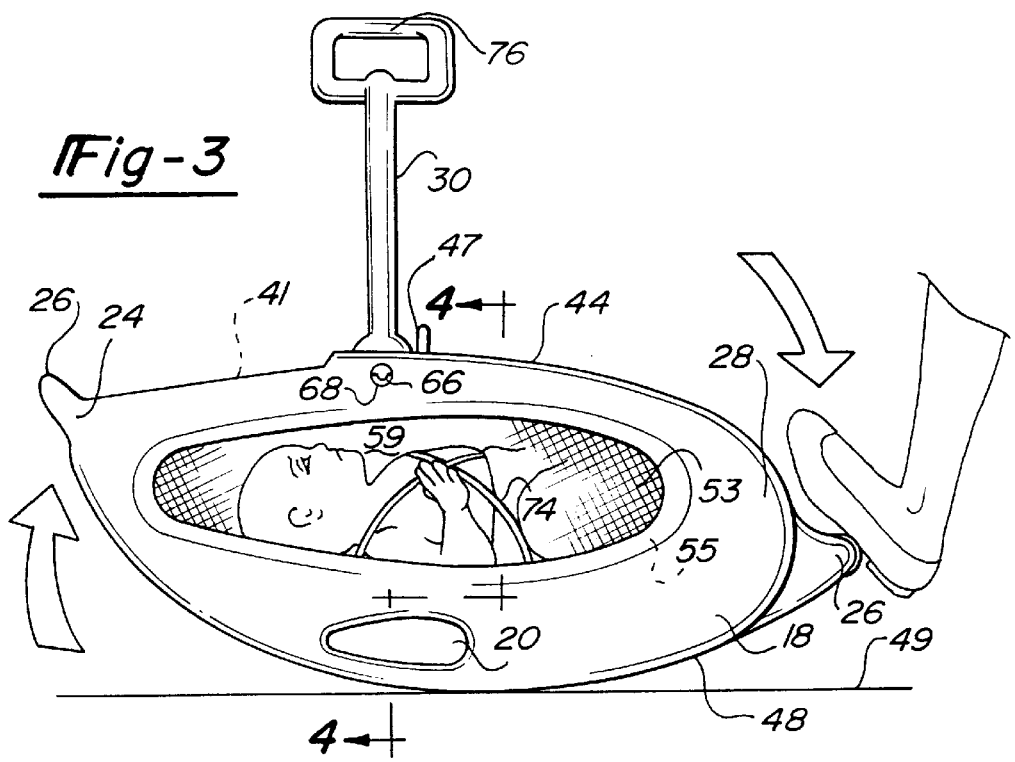
FIG. 3 is a side elevational view of the carrier as shown on a flat floor surface.
Figure 4:
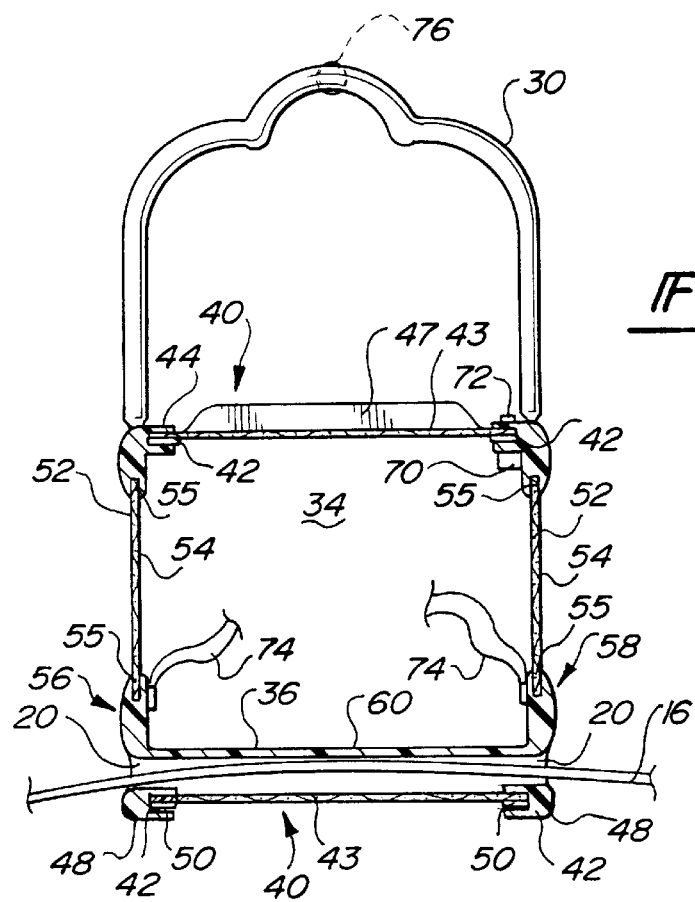
FIG. 4 is a cross sectional view taken along lines 4—4 shown in FIG. 3.

As shown in FIGS. 3 and 4, the housing 12 is made from two almost mirror image halves 56 and 58 that join at the longitudinal center 60 of the housing 12. The handle halves 62 can be inserted into handle halves 64 and are welded therein to provide strength to formed handles 22 and 26.

Figure 2:
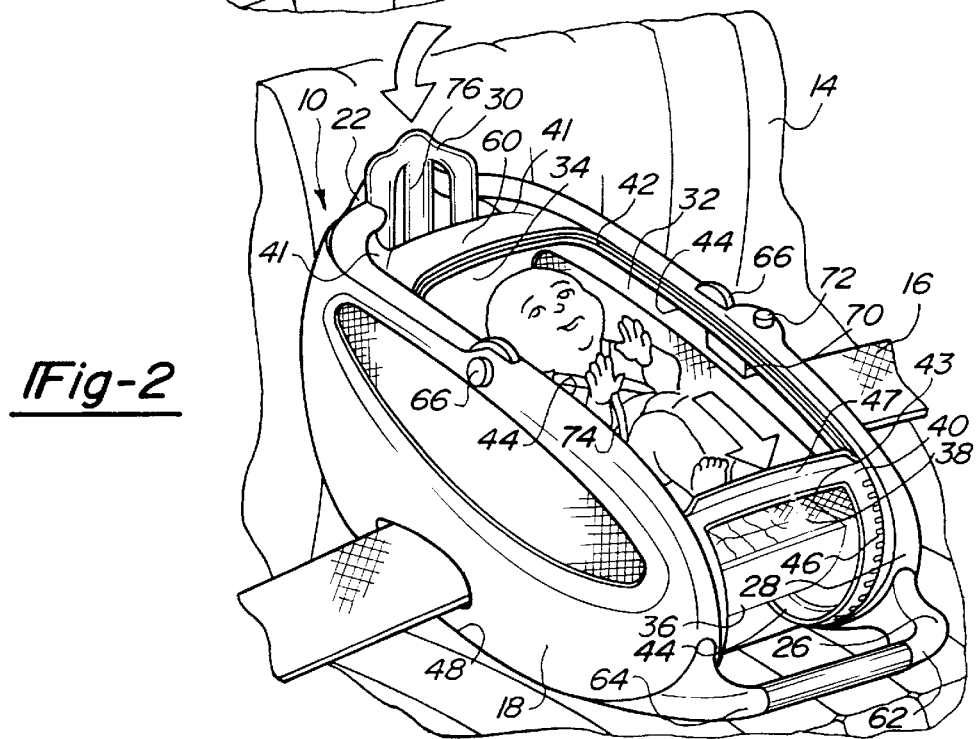
FIG. 2 is a view similar to FIG. 1 shown with the door in the open position and the handle in the stored position for access to the interior of the carrier.

Center handle 30 is separately formed and is pivotally connected at pivot points 66 that are supplied with standard lock and release buttons 68 that operably used to lock the handle 30 in a selected one of a plurality of positions from the upright carrying position as shown in FIG. 1 to the stored position shown in FIG. 2 when access to the interior of the carrier is desired. The handle 30 nests in groove 41 when in the stored position. The handle 30 is provided with a grasping bar 76 that is oriented to be aligned with longitudinal axis 60 for an ergonomic position. When the handle is in the position shown in FIG. 1, the handle may be grasped at bar 76 and the basket is naturally carried at the side of the parent or other carrying person with the longitudinal axis 60 aligned in the direction of travel.

A light 70 is mounted within the carrier for illuminating the interior of the carrier. The light is operably connected to an exteriorly accessible button switch 72 for turning the light on and off. The light housing 70 is constructed to house batteries for power.

Appropriate harness straps 74 are conventionally anchored to the housing for strapping the baby in place on the cushion 38.

The use and operation of the carrier can now be described. When an infant is to be positioned within the carrier, the handle 30 is positioned to the stored position and the door 40 is slid to the open position as shown in FIG. 2. The baby is then easily handled through the opening 32 and is strapped in place on the cushion 38 via harness straps 74. The door is then closed to the position shown in FIG. 1. The wide expanse of window area and light transparent nylon mesh allows good visibility of the infant and allows the infant a wide field of vision.

The carrier can be used for a multiple number of purposes. The handle 30 can be locked in the position shown in FIG. 1 and carried at the grasping bar 76 as described above. Alternatively, the carrier can be lifted and carried like a basket by a person with both hands, one hand grasping the head handle 22 and one hand grasping the foot handle 26. The carrier can be positioned on a flat surface 49 as illustrated in FIG. 3 and used as a rocker. The foot handle 28 can be easily pressed by a foot to manually keep the rocker rocking. The carrier can also be positioned and secured in a grocery cart. The closed door 40 provides protection against containers or food packages found along high shelves that may fall onto the carrier.

The carrier as shown in FIG. 1 can be strapped into a motor vehicle. The high side sections 18 particularly with top edges 44 spaced above the positioned infant and the closed door with its mesh covering provides protection to the enclosed infant against an actuated air bag that may press against the carrier during a vehicular accident.

Figure 5:
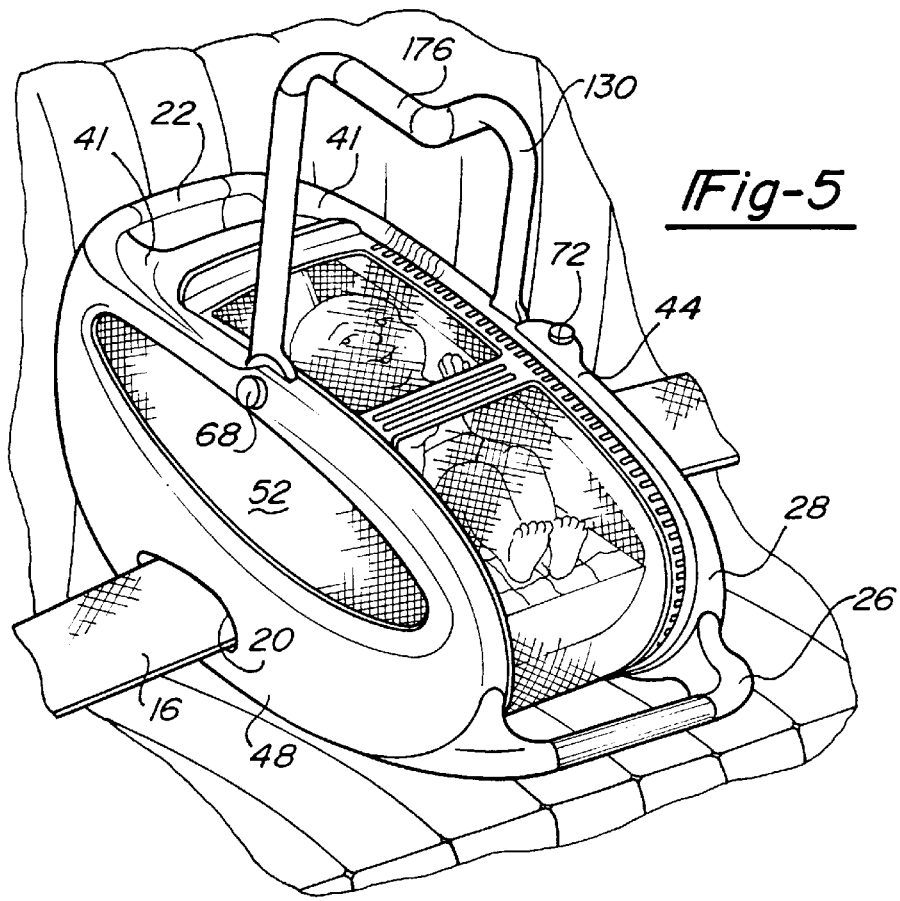
FIG. 5 is a view similar to FIG. 1 illustrating a modified carrying handle in the operable position.
Figure 6:
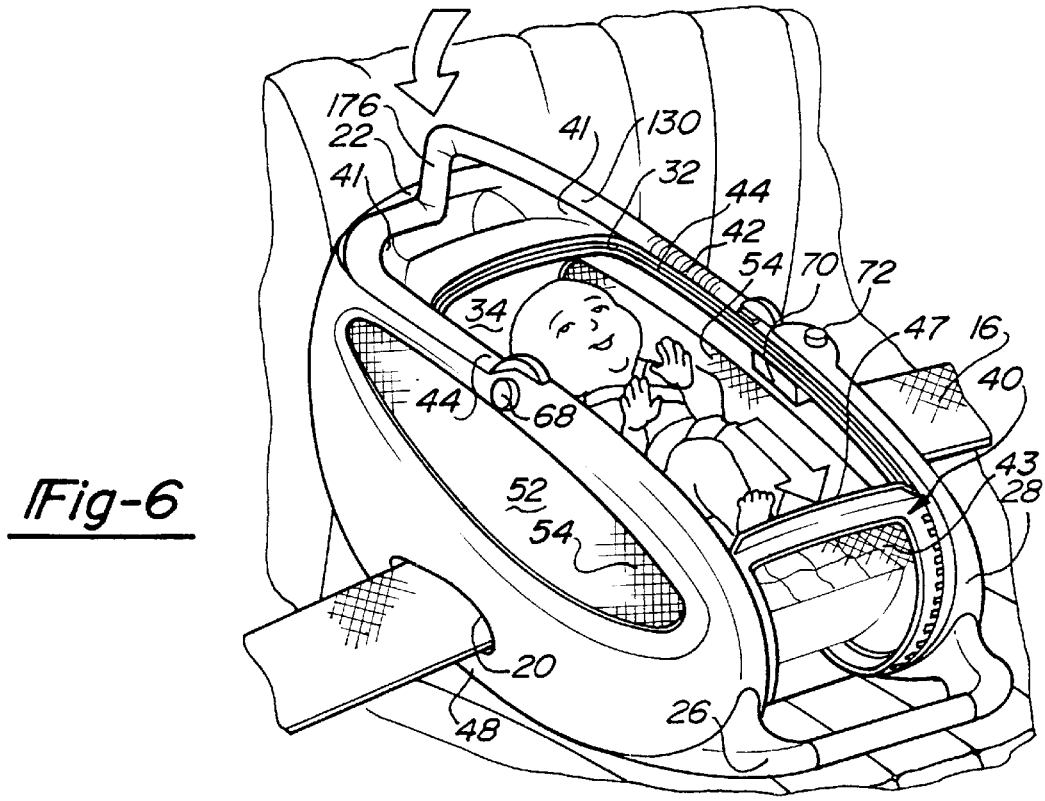
FIG. 6 is a view similar to FIG. 5 illustrating the carrying handle in the stored position.

A modified central handle 130 is illustrated in FIGS. 5 and 6. The handle 130 still maintains a longitudinally oriented grasping bar section 176. However, the handle 130 is made from less plastic. The handle 130 has an asymmetrical s-like appearance. It however can be utilized and stored in the same fashion as handle 30.

In this fashion, an infant carrier provides protection to the infant against direct impact of an actuated air bag while also being portable and function as an independent carrier and rocker. The infant carrier also shields an infant from outside objects while providing for good visibility of the infant, good field of vision for the infant, and easy accessibility and maneuverability for the infant care provider.

Variations and modifications are possible without departing from the scope and spirit of the present invention as defined by the appended claims.

What is claimed is:

1. An infant carrier characterized by:
   a housing having two opposing side sections, a bottom panel for seating cushioned bedding material, a foot section, and a head section to define an infant receiving interior and an opening to the interior;
   a restraining harness mechanism connected to the housing for restraining an infant within the interior section of the housing;
   a sliding door mounted for movement in the opening between an open position and a closed position;
   said sliding door having a substantially rectangular frame at its outer periphery and a flexible sheet of mesh material connected to the frame to form a see through window, said frame having supports extending across the door to provide support for the mesh and the mesh being connected to the extending supports, such that when the door is in the closed position, the mesh is positioned to restrain displacement of an infant's head from out of said carrier seat through said opening and preventing extraneous objects from intruding into said interior and contacting said infant;
   said opening having a track device on a respective side extending from said head section, along each side section, and around said foot section to a position below said bottom panel;
   said frame having side edges continuous along substantially an entire length of said sliding door, said side edges respectively slidably received in each said track device for sliding movement therealong between the open and closed positions;
   said frame being distinct from said mesh in thickness or in material such that said continuous side edges follow a contour defined by said track devices without bunching within said track devices.

2. An infant carrier as defined in claim 1 further characterized by:
   said opening being aligned along the carrier's longitudinal axis and being substantially upwardly facing through a top section of the carrier;
   said frame being flexible in its longitudinal direction to follow the contour of the track device to move between the position below said bottom panel of the carrier and the top section of the carrier.

3. An infant carrier as defined in claim 2 further characterized by:
   said side sections each having a seat belt receiving aperture located below said bottom panel.

4. An infant carrier as defined in claim 3 further characterized by:
   at least one of said side sections having a window opening therethrough;
   a see-through mesh material covering said window and having an outer peripheral section mounted to said side section.

5. An infant carrier as defined in claim 4 further characterized by:
   each of said side sections having a bottom edge that is arced from said head section to said foot section and parallel to each other to provide rocking motion of the carrier when on a flat floor surface.

6. An infant carrier as defined in claim 5 further characterized by:
   a fixed handle located at the respective foot and head sections of the housing to receive a rocking force for manual rocking of the infant carrier when on a flat base surface and to provide for manual lifting of said carrier by two hands;
   said bottom edge being around and extending to said respective handles at said respective foot and head sections.

7. An infant carrier as defined in claim 5 further characterized by:
   a carrying handle having end sections pivotably connected to a respective side section for movement between an operable position and a stored position;
   said carrying handle having a top span section extending across and above said opening when said handle is in an operable position and being in proximity to said top at a head edge of said opening when in the stored position.

8. An infant carrier as defined in claim 7 further characterized by:
   said carrying handle having a grasping section that is longitudinally aligned with the major axis of the carrier when in the operable position.

9. An infant carrier as defined in claim 7 further characterized by:
   a lock mechanism to selectively lock the handle in place and prevent pivoting of the handle with respect to said carrier when in said operable position.

10. An infant carrier as defined in claim 9 further characterized by:
    a light mounted on said housing for illuminating the interior of said carrier.

11. An infant carrier as defined in claim 2 further characterized by:
    a carrying handle having end sections pivotably connected to a respective side section for movement between an operable position and a stored position;
    said carrying handle having a top span section extending across and above said opening when said handle is in an operable position and being in proximity to said top at a head edge of said opening when in the stored position.

12. An infant carrier as defined in claim 11 further characterized by:
    said carrying handle having a grasping section that is longitudinally aligned with the major axis of the carrier when in the operable position.

13. An infant carrier as defined in claim 11 further characterized by:
   a lock mechanism to selectively lock the handle in place and prevent pivoting of the handle with respect to said carrier when in said operable position.

14. An infant carrier characterized by:
   a housing having two opposing halves affixed together along a longitudinal axis of said carrier, said housing having two opposing side sections, a bottom panel for seating cushioned bedding material, a foot section, and a head section to define an infant receiving interior and an opening to the interior;
   a restraining harness mechanism connected to the housing for restraining an infant within the interior section of the housing;
   a roll door having a substantially rectangular frame at its periphery mounted for movement in the opening to the interior between an open position and a closed position;
   said opening being aligned along the carrier's longitudinal axis and being substantially upwardly facing through a top section of the carrier and having a curved track device at each lateral side thereof extending from said head section along each side section and which curves around said foot section to a position below said bottom panel;
   said frame having side edges continuous along substantially an entire length of said sliding door, said side edges respectively slidably received in each said track device for sliding movement therealong between the open and closed positions;
   said roll door being flexible along its longitudinal length to follow the contour of the track device to move from the bottom section of the carrier, through the foot section and to the top section of the carrier;
   said roll door having a plurality of windows of see-through flexible material disposed in said frame;
   said frame having supports laterally extending between said side edges that are connected to the see-through flexible material and which define said plurality of windows thereof such that when in the closed position the door is positioned to restrain displacement of an infant's head from out of said carrier seat through said opening and preventing extraneous objects from intruding into said interior and contacting said infant;
   said frame being distinct from said see-through flexible material in thickness or in material such that said continuous side edges follow a contour defined by said track devices without bunching within said track devices.

15. An infant carrier as defined in claim 14 further characterized by:
   said side sections each having a seat belt receiving aperture located below said bottom panel.

16. An infant carrier as defined in claim 15 further characterized by:
   each of said side sections having a window opening therethrough;
   a see-through mesh material covering said window and having an outer peripheral section mounted to said side section;
   said see-through material in said windows of said roll door being a mesh material.

17. An infant carrier as defined in claim 16 further characterized by:
   each of said side sections having a bottom edge that is arced from said head section to said foot section and parallel to each other to provide rocking motion of the carrier when on a flat floor surface.

18. An infant carrier characterized by:
   a housing having two opposing side sections, a bottom panel for seating cushioned bedding material, a foot section, and a head section to define an infant receiving interior and an opening to the interior;
   a restraining harness mechanism connected to the housing for restraining an infant within the interior section of the housing;
   a sliding door mechanism mounted for movement in the opening between an open position and a closed position;
   said sliding door having a frame at its outer periphery and a flexible sheet of mesh material connected to the frame such that when the door is in the closed position, the mesh is positioned to restrain displacement of an infant's head from out of said carrier seat through said opening and preventing extraneous objects from intruding into said interior and contacting said infant;
   said opening being substantially upwardly facing through a top section of the carrier and having a curved track device at each side thereof which curves around said foot section to a position below said bottom panel;
   said frame being flexible to follow the contour of the track device to move between the bottom section of the carrier and the top section of the carrier;
   said side sections each having a seat belt receiving aperture located below said bottom panel;
   at least one of said side sections having a window opening therethrough;
   a see-through mesh material covering said window and having an outer peripheral section mounted to said side section;
   each of said side sections having a bottom edge that is arced from said head section to said foot section and parallel to each other to provide rocking motion of the carrier when on a flat floor surface; and
   said track section at each side section passing below said seat belt receiving aperture and is substantially parallel to the contour of arced bottom edge.

19. An infant carrier characterized by:
   a housing having two opposing halves affixed together along a longitudinal axis of said carrier, said housing having a bottom panel for seating cushioned bedding material, a foot section, and a head section to define an infant receiving interior and an opening to the interior;
   a restraining harness mechanism connected to the housing for restraining an infant within the interior section of the housing;
   a roll door mechanism mounted for movement in the opening to the interior between an open position and a closed position;
   said opening being substantially upwardly facing through a top section of the carrier and having a curved track device at each lateral side thereof which curves around said foot section to a position below said bottom panel;
   said roll door being flexible along its longitudinal length to follow the contour of the track device to move from the bottom section of the carrier, through the foot section and to the top section of the carrier;

said roll door when in the closed position is positioned to restrain displacement of an infant's head from out of said carrier seat through said opening and preventing extraneous objects from intruding into said interior and contacting said infant;

said side sections each having a seat belt receiving aperture located below said bottom panel;

each of said side sections having a window opening therethrough;

a see-through mesh material covering said window and having an outer peripheral section mounted to said side section;

said roll door having windows of a see-through mesh material;

each of said side sections having a bottom edge that is arced from said head section to said foot section and parallel to each other to provide rocking motion of the carrier when on a flat floor surface; and said track section at each side section passing below said seat belt receiving aperture and is substantially parallel to the contour of arced bottom edge.

\* \* \* \* \*